United States Patent Office 3,373,135
Patented Mar. 12, 1968

3,373,135
SHAPED ARTICLES OF SELF-EXTINGUISHING EPOXY RESINS
Herbert Jenkner, Cologne-Deutz, and Hans Eberhard Praetzel, Bensberg-Frankenforst, Germany, assignors to Chemische Fabrik Kalk G.m.b.H., Cologne-Kalk, Germany
No Drawing. Filed Dec. 1, 1965, Ser. No. 510,959
Claims priority, application Germany, Dec. 1, 1964, C 34,507
3 Claims. (Cl. 260—45.7)

ABSTRACT OF THE DISCLOSURE

Self-extinguishing cured epoxy resin molding compositions containing about 0.1 to 20% of halogen bound directly to a carbon atom in an organic compound and an effective amount of red phosphorus to render said compositions self-extinguishing.

---

The present invention relates to improved shaped articles of epoxy resins (polyepoxides) and a process for producing the same.

The combustibility of epoxy resins, as is known, can be considerably decreased by the addition of organic halogen containing compounds. It furthermore has been found that halogenated bisphenols could be condensed in, in the production of flameproof hardenable epoxy resins. Because of the ether bonds and the high carbon and hydrogen content the shaped articles produced from such epoxy resins are still combustible. It is therefore necessary to add or work in large quantities of halogen compounds in order to obtain shaped epoxy resin articles which are of self-extinguishing character.

It was found, on the other hand, that the halogen content of such shaped articles could be reduced substantially if phosphorus containing or antimony containing compounds were added to the mixture to be hardened. Preferably phosphorus containing compounds were used for this purpose which are capable of being co-condensed with the epoxy resins which contain the reactive group either over a P-O-C bond or over a P-C bond. P-O-C bonds, as is known, are easily hydrolysed.

Such hydrolysis causes a cleavage in the macromolecule concerned and the resulting cleavage products on their part sequentially attack other macromolecules. In view of this, the mechanical stability of epoxy resins produced with organic phosphorus compounds containing P-O-C bonds are very greatly impaired in the course of time.

The complicated procedures required for the preparation of the more difficultly hydrolysable organic phosphorus compounds containing P-C bonds stand in the way of their large scale commercial application.

A further disadvantage of both of such types of the phosphorus compounds, which is of importance, is their relatively low phosphorus content. In order to attain satisfactory flameproof properties in the shaped articles produced from epoxy resins, it is necessary to incorporate large quantities of organic phosphorus compounds therein. However, additions of large quantities of phosphorus and/or halogen containing organic compounds to epoxy resins have a detrimental influence on the physical properties on the shaped articles produced therefrom. For example, with increasing quantities of such additions the heat resistance, resistance to aging, the breaking and bending strength and the electric insulating properties of the articles produced from epoxy resin compositions containing such additions decrease.

It is an object of the invention to provide a way to obtain shaped articles of epoxy resin compositions of satisfactory flame resistance which avoid the above indicated deficiencies.

According to the invention it was found that this object could be achieved by incorporating red phosphorus in epoxy resin compositions containing organically bound halogen, the usual curing agents for epoxy resins and, if desired, fillers, before they are cured to the shaped articles. The term organically bound halogen is used herein in its normal sense to designate halogen bound directly to a carbon atom in an organic compound.

The epoxy resin molding compositions employed can be produced by known methods by reaction of an epihalohydrin, especially, epichlorohydrin, with polyhydric phenols in the presence of alkalies. However, it also is possible to react polyhydric alcohols with epichlorohydrin in two steps, in the first of which boron fluorides or sulfuric acid is employed as the catalyst to produce chlorohydrin ethers. These then can be reacted in a second step in the presence of alkalies with further epichlorohydrin to branched epoxy resin molding compositions. These branched epoxy resin molding compositions, however, always contain a small quantity of the chlorine which was introduced with the epichlorohydrin. The thus obtained epoxy resin molding compositions as a rule are thermoplastic materials which only cure after the addition of so-called curing agents. The following can, for example be used as curing agents: dicarboxylic acid anhydrides such as tetrahydrophthalic acid anhydride or endomethylene tetrahydrophthalic acid anhydride or amines such as diethylene triamine, triethylene tetramine, dimethyl amino propyl amine, m-phenylene diamine, p,p-diamino-diphenyl methane or reaction products of polyepoxides with excess quantities of amines.

In order to provide the desired halogen content in the epoxy resin molding composition, it is advantageous to employ organic halogen compounds, such as, the chloro and bromo substituted bisphenols, which are built into the polyepoxide molecules. The chlorinated or brominated bishydroxyphenyl methane or propane are especially suited for this purpose. These compounds are employed in place of a corresponding portion of the halogen free bisphenols usually employed so that the epoxy resin molding masses contain both halogen containing and halogen free polyhydric phenols. Similarly in aliphatic epoxy resins a portion of the normal halogen free polyhydric alcohols may be replaced by halogen containing polyhydric alcohols such as pentaerythritol dihalogen hydrin, tribromo-phenyl glycerine ether.

The halogen, if desired, can also be supplied by the anhydrides of dicarboxylic acids used as curing agents such as, for example, halogenated tetrahydrophthalic acid anhydride or chlorendic anhydride (HET anhydride).

The halogen content of the epoxy resin molding compositions should amount to about 0.1 to 20 weight percent, preferably, 3 to 8 weight percent. The effectiveness of chlorine is only about ⅓ to ½ that of bromine so that when chlorine replaces bromine about 2 to 3 times the amounts are required to provide an equivalent effect.

While red phosphorus, which is employed according to the invention, by itself ignites and supports combustion, it unexpectedly acts as a flame retarding component when incorporated in the shaped cured articles produced from halogen containing epoxy resins. As a consequence, it therefore is possible to produce shaped articles which are self-extinguishing simply by admixing red phosphorus with halogen containing, especially, bromine and/or chlorine containing polyepoxide-curing agent molding compositions.

The red phosphorus should be distributed as uniformly as possible in the epoxy resin molding compositions. Such uniform distribution can be effected most simply in filler containing molding compositions if the red phosphorus is first intimately mixed with the filler and such mixture is then worked into the epoxy resin molding composition. The incorporation of 0.2 to 5 weight percent of red phosphorus is entirely sufficient to obtain cured shaped articles from halogen containing epoxy resin molding compositions which are self-extinguishing. The thus obtained self-extinguishing shaped articles contain a small quantity of phosphorus in elemental form in which it has no detrimental influence on the physical and mechanical properties of such articles.

It was already known that red phosphorus could be added to molding compositions from which polyurethane foams are prepared in order to reduce their combustibility. However, as the shaped articles produced from epoxy resin molding masses are structurally completely different and contain considerably more bound oxygen than polyurethanes, it was not to be foreseen that red phosphorus would be of outstanding effectiveness as a flameproofing agent in cured epoxy resin molding compositions.

The following examples will serve to illustrate the invention. The proportions given in the examples are by weight unless specified otherwise.

The combustibility tests of the samples produced in the examples were carried out according to ASTM specification 635. According thereto test rods dimensioned 13 x 6.5 x 127 mm. are cut out of cured products to be tested. These test rods were clamped at one end by a supported clamp in horizontal position in such a way that the narrow sides of the largest lateral surfaces were at a 45° angle from horizontal. A Bunsen burner wire netting about 10.3 cm.$^2$ with 58 mesh per cm.$^2$, the length of which was 116 mm., was clamped 9.6 mm. below the test rod. For combustibility test the free end of the test rod was contacted with a colorless Bunsen burner flame for 30 seconds and the time required for the flame in the test rod to extinguish after removal of the Bunsen flame measured.

*Example 1*

10.25 parts of 4,4'-bis(hydroxyethyltetrabromooxyphenyl-2,2-propane (bromine content 48.8%)
78.0 parts of 4,4' - bis(hydroxyethyloxyphenyl)-2,2-propane-bis-glycidylether and
11.0 parts of m-phenylene diamine were mixed. Subsequently an intimate mixture of 2 parts of red phosphorus and 200 parts of quartz meal were worked into the first mixture and the resulting molding composition shaped and cured for 4 hours at 125° C.

The combustibility tests showed that the flame extinguished in less than 10 seconds after removal of the Bunsen flame.

*Example 2*

84.3 parts of 4,4' - bis(hydroxyethyloxyphenyl)-2,2-propane-bis-glycidylether
6.5 parts of m-phenylene diamine and
9.2 parts of 1,4-bis-(aminomethyl)-dibromobenzene were mixed. Subsequently an intimate mixture of 2 parts of red phosphorus and 200 parts of quartz meal were worked into the first mixture and the resulting molding composition shaped and cured for 4 hours at 125° C.

The combustibility tests showed that the flame extinguished in less than 10 seconds after removal of the Bunsen flame.

We claim:
1. A shaped article of a cured epoxy resin molding composition containing about 0.1 to 20% by weight of organically bound halogen and an effective amount of red phosphorus uniformly distributed therein to render said article self-extinguishing.
2. The shaped article of claim 1 in which the quantity of red phosphorus is 0.2 to 5% by weight.
3. A shaped article as in claim 1 in which said organically bound halogen is bound in the polyepoxide molecules of the cured epoxy resin.

References Cited

UNITED STATES PATENTS 3,312,636    4/1967    Rizzo _____ 260—45.7 X

FOREIGN PATENTS 1,173,641    7/1964    Germany.

DONALD E. CZAJA, *Primary Examiner.*

M. J. WELSH, *Assistant Examiner.*